United States Patent
Tichborne et al.

(10) Patent No.: US 7,603,242 B2
(45) Date of Patent: Oct. 13, 2009

(54) FUEL LEAK ESTIMATOR

(75) Inventors: Franklin George Tichborne, Bristol (GB); Raymond Clarke, Bristol (GB); Michael Daniel Brown, Southampton (GB)

(73) Assignee: Airbus UK Limited, Bristol (GB)

( * ) Notice: Subject to any disclaimer, the term of this patent is extended or adjusted under 35 U.S.C. 154(b) by 188 days.

(21) Appl. No.: 11/663,465

(22) PCT Filed: Sep. 21, 2005

(86) PCT No.: PCT/GB2005/003628

§ 371 (c)(1),
(2), (4) Date: Mar. 22, 2007

(87) PCT Pub. No.: WO2006/032873

PCT Pub. Date: Mar. 30, 2006

(65) Prior Publication Data

US 2008/0103703 A1    May 1, 2008

(30) Foreign Application Priority Data

Sep. 22, 2004    (GB) .................... 0421124.9

(51) Int. Cl.
G01M 3/26    (2006.01)
(52) U.S. Cl. ...................................................... 702/51
(58) Field of Classification Search .................. 702/51, 702/45, 50, 55; 73/40, 40.5 R
See application file for complete search history.

(56) References Cited

U.S. PATENT DOCUMENTS

| | | | | |
|---|---|---|---|---|
| 4,727,748 A | * | 3/1988 | Horigome et al. .............. | 73/40 |
| 4,972,700 A | * | 11/1990 | Le ................................. | 73/40 |
| 5,461,903 A | | 10/1995 | Harms | |
| 6,082,392 A | * | 7/2000 | Watkins, Jr. ................. | 137/312 |
| 6,413,223 B1 | * | 7/2002 | Yang et al. ................... | 600/485 |
| 6,502,042 B1 | | 12/2002 | Eid et al. | |

(Continued)

FOREIGN PATENT DOCUMENTS

EP    1 139 076 A3    10/2001

(Continued)

OTHER PUBLICATIONS

Benkherouf et al. "Leak Detection and Location in Gas Pipelines", Mar. 1988, IEEE Xplore, pp. 142-148.*

(Continued)

*Primary Examiner*—Michael P. Nghiem
*Assistant Examiner*—Cindy H Khuu
(74) *Attorney, Agent, or Firm*—Patterson, Thuente, Skaar & Christensen, P.A.

(57) ABSTRACT

A method of detecting a fuel leak from a fuel store of an aircraft where a processor receives inputs relating to the amount of fuel in the fuel store and to the rate of fuel used by the aircraft. The processor defines a fuel flow system state defined by a noise-compensated measures of the amount of fuel in the fuel store, a fuel leak amount estimate and a fuel leak rate estimate. The processor periodically calculates a new estimated state of the system in view of a previous estimated state and values of the inputs. The processor monitors the fuel leak amount estimate and the fuel leak rate estimate and if either exceeds a respective threshold value send a signal to a fuel leak warning device.

20 Claims, 2 Drawing Sheets

U.S. PATENT DOCUMENTS

2002/0112527 A1* 8/2002 Nadin .................. 73/49.2
2005/0115314 A1* 6/2005 Meagher .............. 73/290 B

FOREIGN PATENT DOCUMENTS

| JP | 58092835 A | 6/1983 |
| JP | 04236900 A | 8/1992 |
| JP | 08277750 A | 10/1996 |
| WO | WO 00/72750 A1 | 12/2000 |

OTHER PUBLICATIONS

Sheng et al. "Gas Leakage Detection System Using Kalman Filter", Aug. 31-Sep. 4, 2004, IEEE Xplore, pp. 2533-2536.*
Verde et al. "Identifiability of Multi-Leaks in a Pipeline", Jun. 30-Jul. 2, 2004, IEEE Xplore, pp. 4378-4383.*
Peter S. Maybeck, "Stochastic models, estimation, and control," vol. 1, Chapter 1, Academic Press, pp. 1-16 (1979).
Greg Welch, et al., "An Introduction to the Kalman Filter," UNC-Chapel Hill, TR 95-041, pp. 1-16 (Mar. 2002).

* cited by examiner

FUEL LEAK ESTIMATOR

RELATED APPLICATIONS

The present application is a National Phase entry of PCT Application No. PCT/GB2005/003628, filed Sep. 21, 2005, which claims priority from, United Kingdom Application Number 0421124.9, filed Sep. 22, 2004, the disclosures of which are hereby incorporated by reference herein in their entirety.

TECHNICAL FIELD

The present invention relates to a method of detecting a fuel leak from a store of fuel in an aircraft, for example an aircraft fuel tank and means for performing the method, for example apparatus, a circuit, and/or software.

BACKGROUND OF THE INVENTION

It is desirable to be able to detect a fuel leak from an aircraft fuel tank. There are several different possible causes for fuel leaks in an aircraft including foreign objects impacting against the fuel tank or associated system, and development of faults in the fuel tank and associated system resulting from fatigue and/or wear and tear. More specifically, and by way of example, in an aircraft potential causes of fuel tank leaks include improper maintenance, improper manufacture, natural component ageing, uncontained engine rotor failure, battle damage, damage from impact of other foreign objects (for example, debris on the runway during take off or landing), system malfunctions or errors (for example, during to air to air refuelling, jettisoning fuel, de-fuelling or unintentional over-pressurising of the fuel tanks) and general component malfunction (for example, including the malfunction of components not directly associated with the fuel tank system which could subsequently cause damage to the fuel tank system). Fuel may of course leak from the fuel tank itself or any part of the aircraft in which fuel is present. By way of example, fuel may leak directly from a hole in the tank structure, from a hole in a fuel pipe or from a faulty seal between fuel pipes, or may leak from the surge tanks (the surge tanks accommodating overflow of fuel in the rest of the fuel system but only having a limited capacity which, if exceeded, leads to fuel being expelled out of the aircraft to atmosphere).

One method of detecting a fuel leak is to compare the amount of fuel used by the aircraft with the decrease in the quantity of fuel stored in the fuel tank. If the decrease in fuel stored is greater than quantity of fuel used, it may be concluded that there is a fuel leak. There are however difficulties in accurately and promptly detecting fuel leaks in an aircraft. For example, it is difficult to obtain an accurate measure of the amount of fuel in the fuel tanks because the fuel in the tank moves within the fuel tank as a result of movement and vibration of the aircraft so that measurements of the amount of fuel in the fuel tank are subject to error. Of course measurements relating to other parameters, from which the amount of fuel being used can be ascertained are also subject to a certain level of error.

A fuel leak detection system currently in use on an aircraft will now be described. The system decides whether or not there may be a fuel leak by comparing the decrease in the quantity of fuel stored with the quantity of fuel which has flowed from the tank to the engine over the same period. The difference in the two quantities can be expressed in algebraic form as follows:

$$\text{fuel discrepancy} = FQI - \int \text{fuel rate } dt - TOFOB$$

where

FQI=current fuel quantity indication, fuel rate=measure of rate of fuel flow from a flow meter(s) in the fuel pipeline (a negative value, since fuel leaves the feed fuel tanks and enters the engine), and TOFOB=take-off fuel on board.

A leak parameter is obtained by passing the discrepancy signal through an n-point moving average filter where typically n is greater than 50. So that $$\text{leak parameter} = \text{filter } \{FQI - \int \text{fuel rate } dt - TOFOB\} \quad (1)$$

The function of the filter is to reduce the effect of random measurement errors usually referred to as noise which primarily affect the FQI measurement but are also present to a lesser extent in the fuel rate measurement.

In an ideal situation the leak parameter would only deviate from zero if a leak was present. The imperfect nature of the filter and the presence of systematic or offset measurement errors, however, mean that the leak parameter must exceed a pre-specified threshold to be indicative of a leak with the appropriate degree of confidence.

It has been found however that the currently used method suffers from a number of disadvantages as will now be explained. In order to avoid or reduce the number of false alarms the threshold, which the fuel leak parameter must exceed before the system deems that there is a fuel leak, is set relatively high. For example, a typical fuel tank gauge for making FQI measurements may only be required to provide FQI measurements such that the error in the measurements, whilst the fuel tank is greater than 20% full of fuel, is ±2%. The capacity of the fuel tanks might be of the order of about 55 tonnes (the fuel used between take-off and landing or refuelling typically being up to about 50 tonnes taking account of a minimum fuel reserve of about 5 tonnes). Thus, when the fuel tank is full the fuel leak system assumes an error in the FQI measurement of about 4% of the fuel on board, equating to about 2.2 tonnes of fuel. For example, consider the case where the amount of fuel in the tank is exactly 50 tonnes. The FQI measurement could be between 49 and 51 tonnes. The leak measurement system must however assume an error of ±2%, so that a FQI measurement of 49 tonnes might result from an actual fuel quantity of 50 tonnes or 48.04 tonnes, the latter value being about 4% different from the real quantity. The threshold is therefore set to be above 2.2 tonnes. By providing a relatively high threshold that the leak parameter has to exceed before a potential leak is detected, a significant quantity of fuel may be lost before detection occurs.

The present invention thus seeks to provide an improved method of leak detection and/or to provide a method of detecting leaks that mitigates one or more of the above-mentioned disadvantages associated with the above-described method currently in use.

SUMMARY OF THE INVENTION

The present invention provides a method of detecting a fuel leak from a fuel store of an aircraft, the method comprising the steps of:

(i) receiving at a circuit signals representative of physical measurements made at a plurality of successive times of the amount of fuel in the fuel store and of the rate of fuel flowing from the fuel store, the measurements each being subject to noise, (ii) the circuit defining, in state-space, a fuel flow system state, the state of the system being defined by a set of variables including at least one variable relating to a quantity represented by the signals received in step (i) and a variable relating to fuel leakage from the fuel source, (iii) the circuit ascertaining a new state of the system in view of a previously ascertained state of the system and a plurality of the measurements represented by the signals received in step (i), (iv) the circuit identifying from the new state of the system whether there might be a fuel leakage, and, if appropriate, (v) causing an indication that there is a suspected fuel leak to be made. Certain embodiments of the method advantageously define the state of the system assuming that there is a leak. Step (iv) of the method may simply comprise considering the value of a fuel leak variable and deeming a leak in dependence on that fuel leak value. The inclusion of a fuel leak variable in the system state is considered to be of great advantage. Step (iv) of the method may be considered as effectively deciding if the amount and/or rate of fuel measured as flowing out of the fuel store is less than would be expected in view of the amount and/or rate of reduction of fuel in the fuel store, and if there exists a significant disparity deeming a leak.

The ascertaining of the new state of the system advantageously takes into account the history of the system state and may for example weight certain physical measurements as being more prone to error than others. The result of this step may, in certain embodiments, provide a smoothed (or filtered) indication of a fuel leak variable over time, in a manner that is advantageously not as processor-memory intensive as a simple n-point moving-average filter. Indeed, the method of the invention may in accordance with certain embodiments of the invention be performed without the use of a separate computer, processor or the like.

Step (iv) of the method may comprise comparing the amount by which the quantity of fuel in the fuel store has reduced, as defined by the new ascertained state of the system, with the amount of fuel that has flowed from the fuel store as defined by the new ascertained state of the system. Alternatively or additionally, step (iv) of the method may comprise comparing the rate at which the quantity of fuel in the fuel store is reducing, as defined by the new ascertained state of the system, with the rate of fuel flowing from the fuel store, as defined by the new ascertained state of the system. Step (iv) of the method may comprise ascertaining, for example by means of a calculation, a fuel leak amount from one or more values of the new ascertained state of the system. Step (iv) of the method may comprise ascertaining, for example by means of a calculation a fuel leak rate from one or more values of the new ascertained state of the system.

The circuit may be configured to deem a leak present in the event that a variable relating to fuel leakage of the new ascertained state of the system is greater than a preset threshold. For example, the circuit may be configured to deem a leak present in the event that the fuel leak amount is greater than a preset threshold. For example, the circuit may be configured to deem a leak present in the event that the fuel leak rate is greater than a preset threshold.

At least one of the plurality of measurements used in step (iii) may be a current (up-to-date) measurement.

In certain embodiments of the invention, the ascertaining of the new state of the system advantageously takes into account only one previous ascertained state of the system. The resulting method may thus be performed with relatively little memory. During step (iii) the plurality of the measurements taken into account by the circuit when ascertaining the new state of the system may be representative of a plurality of different quantities (for example of different types). In respect of at least one, preferably two, and more preferably all of the respective different variables taken into account when ascertaining the new state of the system, the time of the or each physical measurement is identical in respect of a single variable. For example, several simultaneous measurements may be made of the amount of fuel in the fuel store. One of the variables taken into account when ascertaining the new state of the system may be derived from a physical measurement taken at a time different from the time at which a physical measurement of another of the variables taken into account is made. One of the variables taken into account when ascertaining the new state of the system is conveniently derived from a physical measurement taken at substantially the same time as the time of the system to which the new state relates. The new state may thereby reflect a relatively up-to-date estimate of the state of the system. One of the physical measurements may be a measure of the rate of fuel flowing from the fuel store. One of the physical measurements may be a measure of the amount of fuel in the fuel store. Each measurement taken into account may be associated with a unique variable.

The ascertaining of the new state of the system may, for example, take into account a single previous ascertained state of the system, a single previous physical measurement of one of (a) the rate of fuel flow from the fuel store and (b) the amount of fuel in the fuel store and a single current physical measurement of the other one of (a) the rate of fuel flow from the fuel store and (b) the amount of fuel in the fuel store.

The ascertaining of the new state of the system may in effect be equivalent to predicting an estimate of the state of the system at a first instant in time using only historical measurements (including for example a previous ascertained state of the system and a previous physical measurement) and then in view of a current measurement (preferably of a physical measurement different in type from any used in the prediction) correcting the predicted state of the system. In certain embodiments of the present invention, the correcting step advantageously weights the correction with the use of a preset weighting rule. The weighting rule is preferably constant. The weighting rule may alternatively be automatically updated in view of the accuracy of the predicting step. The accuracy of the predicting step may be measured by means of an estimated updated covariance representative of the error of the ascertaining (for example of a calculation) of the new state. The ascertaining of the new state of the system may thus in effect be equivalent to a recursive state estimation method. The recursive state estimation may for example be achieved by means of an optimal linear estimator assuming white Gaussian noise in the measured variables. The state estimations may for example be effected using a Kalman filter method. The circuit used in the method may be in the form of a processor, for example a microprocessor or a computer or part thereof. It will be appreciated however that the function of the method according to at least some embodiments of the present invention may be achieved without the use of a processor, computer or the like. For example, analogue and/or digital circuitry could be arranged to perform the function of the circuit in the method.

It will be appreciated from the foregoing that the method of certain embodiments of the invention may advantageously be effected by means of using (for example processing) measurements of measured fuel flow rates and measured fuel quantities in the fuel store to ascertain (for example calculating) an estimated fuel leak amount and an estimated fuel leak rate. Furthermore, future estimated fuel leak rates and fuel leak amounts may be ascertained in view of data or signals concerning measured fuel flow rates and fuel quantities in view of a previous estimated fuel leak rate and a previous estimated fuel leak amount. As such the method of certain embodiments of the invention can produce an improved fuel leak detection method that is not only less prone to misdiagnosis through measurement errors, but is also less demanding on memory and processor capability than prior art leak detection methods (the demand on such capabilities being so low that a processor or computer might not be necessary to perform the method according to at least some embodiments of the invention). The circuit may however be in the form of a processor and may for example process signals and derive variables. The processor may calculate the system state in view of various data.

The circuit may, from the signals received, produce variables from which can be derived without the need for calculus a first parameter equal to a measure of the amount by which the quantity of fuel in the fuel store has reduced over a first period of time, a second parameter equal to a measure of the amount of fuel that has been measured as having flowed from the fuel store over the first period of time, a third parameter equal to a measure of the rate at which the quantity of fuel in the fuel store is reducing at a first given instant, and a fourth parameter equal to a measure of the rate of fuel flowing from the fuel store at the first given instant. Preferably, the variables from which the first to fourth parameters can be derived comprise a fuel leak amount and a fuel leak rate. These variables may additionally comprise a measure of a fuel flow rate. These variables may additionally comprise a measure of a fuel amount. Whilst not necessary, the first, second, third and fourth parameters may of course all be directly ascertained by the circuit. Some, and preferably all, of these variables from which the first to fourth parameters can be derived are effectively ascertained by means of steps (i) and (iii) of the method.

Certain embodiments of the present invention can advantageously facilitate detection of a persistent low flow-rate fuel leak, for example by means of effectively comparing the first parameter (a measure of the amount by which the quantity of fuel in the fuel store has reduced over a period of time) with the second parameter (a measure of the amount of fuel that has been measured as having flowed from the fuel store over that period of time). Preferably, a leak is deemed present if the effective discrepancy between the first and second parameters is greater than a preset threshold. Such a threshold may be necessary in view of inaccuracies in the measurements made. The measurement of the amount of fuel in the fuel store may for example be subject to measurement errors of the order of ±2% of the measured amount. Thus, even if the rate of fuel loss by means of the fuel leak is relatively low, certain embodiments of the present invention may enable detection of the leak, even though the rate of fuel loss may be small enough to remain undetected if the embodiments of the present invention relied solely on comparing the rate of the reduction in fuel in the fuel store as ascertained from successive measurements of the amount of fuel in the fuel store and the rate of fuel flow ascertained from the physical measurement(s) of fuel flow-rate(s). For example, consider a large aircraft, having a fuel capacity of 150 tonnes, wherein the rate of fuel used might, when cruising, be of the order of about 10 tonnes per hour. If soon after take-off fuel starts leaking at a constant rate of, say, 0.4 tonnes per hour (i.e. 4% of rate of fuel usage), then, over a period of several hours, the disparity between the amount of fuel measured as flowing out of the fuel store (by a fuel flow meter for example) and the amount by which the quantity of fuel in the store has reduced (as measured by one or more fuel probes for example) will become apparent, enabling the method to detect the low flow-rate leak.

Additionally or alternatively, certain embodiments of the present invention can also advantageously facilitate detection of a transitory high flow-rate fuel leak, for example by means of effectively comparing the third parameter (a measure of the rate at which the quantity of fuel in the fuel store is reducing at a first given instant) with the fourth parameter (the physical measurement of the rate of fuel flowing from the fuel store at the first given instant). Preferably, a leak is deemed present if the effective discrepancy between the third and fourth parameters is greater than a preset threshold. (This threshold would normally be different from the threshold mentioned above in relation to the fuel leak amount value.) In the case of the third parameter (the measure of the rate at which the quantity of fuel in the fuel store is reducing at a given instant), the errors in the third parameter (the errors being the difference between the real and measured values) may be relatively large as a result of the errors of differing sign and magnitude that may be present in the successive measurements of the amount of fuel in the fuel store that are used to ascertain the third parameter. For example, consider the case where there is an amount of 100 tonnes of fuel in the fuel store and a fuel leak rate of about 3 tonnes per hour. The measurement of the amount of fuel in the fuel store may for example be subject to measurement errors of the order of ±2% of the measured amount, that is ±2 tonnes. The fact that the difference between successive measurements of the amount of fuel in the store may in any case be about 4 tonnes, several measurements may need to be made in order for a statistically reliable measure of the rate at which the quantity of fuel in the fuel tank is reducing to be ascertained. However, despite the potential unreliability of the measure of the rate of the reduction of fuel from the fuel store, if a high flow rate leak starts abruptly, the leak may be detected earlier than would otherwise be the case if the embodiments of the invention relied solely on comparing the amount of fuel measured as flowing from the fuel store by means of one or more flow meters with the amount by which the quantity of fuel in the fuel store has reduced as measured by one or more fuel probes in the fuel store. For example, consider a large aircraft, having a fuel capacity of 150 tonnes, wherein the rate of fuel used might, when cruising, be of the order of about 10 tonnes per hour and, during cruise of the aircraft, fuel suddenly starts leaking at a constant rate of, say, 1.5 tonnes per hour (i.e. 15% of the rate of fuel usage). Then, in relation to the measurements of the amount of fuel in the fuel store and the amount of fuel directly measured as flowing from the fuel store, it might take up to 100 minutes in order for a sufficient amount of fuel to be lost (about 2.5 tonnes) before a leak would be recognised, as a result of taking into account the possibility that the difference in the measured amount by which the quantity of fuel in the fuel store has reduced and the calculated amount of fuel used might be due only to measurement error. However, the abrupt change in the rate of fuel leaving the fuel tank is able to be recognised much earlier, even accounting for errors in the measurements. The leak in this case might, for example, be detected at least as quickly as within 30 minutes (i.e. after only 0.75 tonnes of fuel have been lost).

Certain embodiments of the present invention advantageously enable the performance of a leak detection method that combines two separate, but complimentary, ways of monitoring for leaks, one relating to fuel leak rates, the other to fuel leak amounts. Such a method may be considered as effectively comprising steps of assessing discrepancies between measures of the amount of fuel in the fuel store and the amount of fuel flowing from the fuel store as calculated from one or more measured flow rates and the other assessing discrepancies between a measure of a physically measured rate of flow of fuel from the fuel store and a rate of change of fuel in the fuel store as calculated from measurements over time of the amount of fuel in the fuel store. Each way of monitoring for leaks has advantages that compliment the other, such that together an effective and improved method of detecting fuel leaks is provided by embodiments of the present invention.

It will be understood that the signal(s) representative of the rate of fuel flowing from the fuel store is/are representative of fuel flow from the fuel store not accounting for any fuel that may be leaking from the fuel store upstream of the location(s) of flow measurement(s). The signal(s) may simply be representative of the rate of fuel being used by the aircraft, for example the rate of fuel provided to an engine that powers the aircraft. Fuel may of course be caused to flow from the fuel store for purposes other than directly powering the aircraft. For example, fuel may be caused to flow for purposes such as intentional redistribution of fuel from one fuel store to another location either within the aircraft or in another aircraft or vehicle, intentional abandonment of fuel, and unintentional irrecoverable, yet measurable, movement of fuel (not in the form of a leak) from the fuel store without the lost fuel presenting any unacceptable hazard (for example, fuel can, as a result of a fuel transfer malfunction, be moved to a region in which it is then, at least for a certain period of time, irretrievable; such a movement of fuel for the purpose of fuel leak detection can be classified not as a fuel leak, but as a measurable flow of fuel from the fuel store.

The first parameter equal to the measure of the amount by which the quantity of fuel in the fuel store has reduced may effectively be ascertained by means of comparing a measurement of the amount of fuel in the fuel store at a fixed time in the past with a more recent measurement of the amount of fuel in the fuel store. Successive calculations may be made to provide successive measures of the amount by which the fuel in the fuel store has reduced over a successive different periods of time, by comparing the measurement of the amount of fuel in the fuel store at a fixed time in the past with successively more recent measurements of the amount of fuel in the fuel store. The measurement of the amount of fuel in the fuel store at a fixed time may be a measurement of the fuel in the fuel store after the most recent time at which fuel was supplied to the fuel store and before any such fuel is used. The measurement of the amount of fuel in the fuel store is preferably ascertained from signals from a plurality of fuel probes in the fuel store.

The second parameter, equal to the measure of the amount of fuel that has been measured as having flowed from the fuel store, may effectively be derivable, or more preferably ascertained, by means of the circuit integrating a physical measure of a fuel flow rate. The fuel flow rate integrated may be a measure of the rate of fuel flowing from the fuel store. The fuel flow rate integrated may be a measure of the rate of fuel used by the aircraft. The fuel flow rate is conveniently measured directly. For example, the fuel flow rate may be measured by means of one or more fuel flow meters. Such fuel flow meters may be located between the fuel store and an engine of the aircraft. Preferably, such a flow meter is located closer to the engine than to the fuel store, to reduce the regions at which fuel could be lost by leaks, but remain undetected by the flow meter. Flow meters may be provided to measure the rates of fuel flow along all routes along which fuel is permitted to flow from the fuel store.

The third parameter equal to the measure of the rate at which the quantity of fuel in the fuel store is reducing at a given instant may effectively be derivable, or more preferably ascertained, by means of the circuit differentiating (with respect to time for example) a physical measure of the amount of fuel in the fuel store. For example, the third parameter of the rate of the reduction of fuel in the fuel store at a first given instant, at time T, may simply be calculated as follows:

$$\text{rate} = \frac{FQI(T) - FQI(T - \Delta T)}{\Delta T} \qquad (2)$$

where FQI(T) is the measure of fuel in the fuel store at time T and $\Delta T$ is a relatively small time period. In this formula, the rate will of course be expressed as a negative number. It is however preferred for the rate to be calculated in such a way that the calculation takes into account a multiplicity of measurements of the amount of fuel in the fuel tank. Increasing the number of measurements, preferably in respect of different instants of time, when calculating the rate enables noise in the measurements to be reduced.

The fourth parameter, the physical measurement of the rate of fuel flowing from the fuel store at the first given instant, may effectively be ascertained simply by measuring directly the rate of fuel flowing from the fuel store. For example, the fuel flow rate may be measured by means of one or more fuel flow meters. Those fuel flow meters are conveniently the same flow meters that are preferably used in ascertaining the second parameter. Whether or not the same flow meters are used, any of the features described in relation to the flow meters used when ascertaining the second parameter may be incorporated in the flow meters used when ascertaining the fourth parameter.

One or more separate, and possibly independent, physical measurements may be made at a given moment in respect of the amount of fuel in the fuel store or the measured rate of fuel flowing from the fuel store. For example, a plurality of fuel level probes may be used to provide the one or more signals received by the circuit that represent the amount of fuel in the fuel store at a given moment in time. Also, a plurality of fuel flow meters may be used to provide the one or more signals received by the circuit that represent the rate of fuel flowing from the fuel store at a given moment in time.

The method is preferably conducted in respect of a multiplicity of successive instants in time, separated for example by a constant time period. The successive performances of the method are preferably performed more frequently than once a minute, but need not be more frequent than once a second.

In the event that, in step (iv), it is decided that there might be a fuel leak, the step of causing an indication that there is a suspected fuel leak to be made (step v) may comprise sending an electronic warning signal from the circuit. Alternatively, the circuit may stop issuing an "OK" signal, the absence of which causes the indication to be made. The indication to be made, in the event of a suspected leak, preferably includes an advisory warning that alerts the pilot of the aircraft. The warning could for example be in the form of an audible alarm, a recorded message, a visual warning, or a combination thereof.

In certain embodiments of the invention, the method advantageously includes a step of ascertaining, and providing information regarding, the probable location or region of a leak in the event that there is deemed to be a leak. For example, in the case where the method is used to monitor for leaks in relation to several different fuel stores of an aircraft, where fuel flows to a variety of different regions, the steps of the method may be performed in relation to one or more self-contained notional sub-systems of fuel supply and usage in order to ascertain the sub-system in which the leak is present. Further inputs may also be used to provide information regarding the location of a leak. For example, it may be possible by providing a sufficient number of flow meters to measure the rate of fuel flows in certain regions of the fuel system (for example by providing a number of flow meters large enough to provide some internal redundancy), for the circuit to detect anomalies between the measurements of respective flow meters that would provide information regarding the location of a leak. By way of a simplified example, consider a section of fuel pipe for conveying fuel from one region to another, the pipe having an upstream fuel flow rate meter and a downstream fuel flow rate meter. If fuel flow rate measured by the upstream fuel flow rate meter is significantly greater than the rate measured by the downstream fuel flow rate meter (even when accounting for measurement errors), it may be supposed that there is a fuel leak in the pipe at a position in the region between the two meters. Conveniently, however, only one flow meter is supplied per fuel tank in the aircraft. In such a case the location of a leak, once detected, may be determined by means of using valves to isolate one or more fuel tanks for a period of time long enough to ascertain whether a leak is present in the isolated tank(s).

The circuit may be provided with signals relating to various additional inputs. Such additional inputs may be used to improve the accuracy of any calculations or the like performed during step (iii). For example, several physical measurements may be made with a plurality of independent measuring devices, thus yielding in combination a measurement that is likely be more accurate than a single measurement made by a single device. Also, other physical measurements may be made that improve the detection of leaks and/or reduces the chances of the circuit indicating the presence of a leak when in fact there is no leak (i.e. reducing the likelihood of false alarms). The inputs might for example enable detection of leaks that occur downstream of the region at which a fluid flow rate is measured, as otherwise such a leak might remain undetected. For example, inputs could be provided to the circuit regarding the performance of the aircraft and the amount or rate of fuel that has been measured as flowing to the engine(s) of the aircraft. An assessment may then be made as to whether the performance of the aircraft achieved, optionally in view of environmental conditions, is in accordance with the expected the performance of the aircraft in view of the fuel flowing to the engine(s). If the measured performance of the aircraft is lower than the expected performance of the aircraft by an amount greater than a preset threshold, it may be assumed that there is a fuel leak. The performance of the aircraft may be determined by measuring one or more of the parameters of the group consisting of speed of the aircraft, acceleration of the aircraft, engine speed, engine torque, and engine efficiency. As another example, the expected fuel flows resulting from a command from the pilot (for example, by means of the operation of a throttle) can be compared with the measured fuel flows. One cause of a disparity between the expected and measured fuel flows is a fuel leak. The result of the method of certain embodiments of the invention (indicating whether or not there is a "leak") utilising the first to fourth parameters may be compared with the results of other methods conducted by the circuit to detect leaks using other measurements. In cases where the results of one method of leak detection are weak or inconclusive, the results of another alternative method of leak detection may be sufficient to determine with better accuracy whether or not there is a leak.

In step (v), the indication that there is a suspected fuel leak may include an indication of the severity of the leak and/or the confidence of the correct detection of the leak. For example, if there is low confidence of correct detection (or if the rate of fuel leaking is low) then one type of warning may be provided to the pilot, whereas if there is high confidence of correct detection (or if the rate of fuel leaking is high) then a different warning may be provided.

The method may include a step of ascertaining, and providing information regarding, the probable flow-rate of the leak. The method may include a step of ascertaining, and providing information regarding, the probable amount of fuel that has leaked. Such information may be provided by means of the circuit outputting signals based on the results of the performance of step (iii).

As mentioned above, when performing step (iv) to decide whether there might be a leak, a threshold may be used to reduce the chance of the method indicating that there may be a leak, when in fact there is not (the magnitude of the leak values ascertained for example resulting from measurement errors, not from a fuel leak). The threshold may be constant. Preferably, however the threshold is variable. The threshold may be a fixed percentage of one of the measurements or parameters. The threshold may be a variable percentage of one of the measurements or parameters. For example, in the case where a leak is deemed present in the event that the discrepancy between the first parameter (the measure of the amount by which the quantity of fuel in the fuel store has reduced over a period of time) and the second parameter (the measure of the amount of fuel that has been measured as having flowed from the fuel store over that period of time) is greater than a preset threshold, the preset threshold may, for a first range of values of the amount of fuel in the fuel store, be preset at a first percentage of the amount of fuel in the fuel store and preset at a second percentage lower than the first percentage for a second range of values of the amount of fuel in the fuel store lower than the first range. Such a feature may be preferable if the system being monitored is such that the covariance of the error of the measurement expressed as a percentage of the measurement is likely to reduce as the amount of fuel in the fuel store decreases (i.e. the accuracy of the measurement improves), thus allowing the threshold to reduce.

The fuel store may be in the form of a fuel tank. The fuel store may be in the form of a plurality of separate fuel tanks. The separate fuel tanks may of course be interconnected to facilitate transfer of fuel from one tank to another. There may be more than one fuel store. The respective steps of the method may thus be performed in parallel on a per fuel store basis. The method may be performed at the same time in respect of two different fuel stores to monitor for leaks in respect of separate fuel stores. The method may additionally, or alternatively, be performed in respect of a plurality of fuel stores where the plurality of fuel stores are treated insofar as the detection of leaks is concerned as a single global fuel store. For example, if the method is performed to assess whether there is a leak, on a global basis, in relation to a collection of separate fuel tanks, the first and fourth parameters (the amount by which the quantity of fuel in the fuel store has reduced and the rate of flow from the fuel store as measured) may simply be ascertained by summing separate corresponding measurements made in respect of each fuel tank.

In the case where the method is repeated to provide monitoring of fuel leaks over time, it may be necessary to suspend temporarily the monitoring method in certain circumstances. For example, it may be necessary to suspend the method during air-to-air refuelling, as transitory leaks of fuel often occur during such refuelling procedures and are accepted as not presenting any significant hazard.

It will be understood that the value of the fuel leakage variable may be non-zero even though there is no fuel leak whatsoever, as a result of the noise in the measurements, which being effectively random is impossible to remove completely.

As will be appreciated the variables that define the system state may include rates of fuel flow, amounts of fuel measured or ascertained at either an instant in time or measured in respect of a given time interval.

The present invention also provides a circuit arranged to perform the method of the present invention. The circuit may for example be arranged to receive inputs representative of the amount of fuel in the fuel store, and of the rate of fuel flowing from a fuel store of the aircraft. The circuit may also be arranged to provide an output indicative of whether there might be a fuel leakage. As mentioned above, the circuit may be in the form of a processor, for example a suitably programmed processor.

The present invention also provides a software product, carrying software enabling a processor to perform the method of the present invention. The software product may for example be in the form of a conventional data carrier, such as a CD-ROM. The present invention also provides software, preferably in electronic form, for enabling a processor to perform the method of the present invention.

The present invention further provides an aircraft including a circuit arranged to perform the method of the invention to monitor for a leak of fuel from one or more fuel tanks in the aircraft.

BRIEF DESCRIPTION OF THE DRAWINGS

An embodiment of the present invention will now be described by way of example with reference to the accompanying schematic drawings of which.

DETAILED DESCRIPTION

Figure 1:
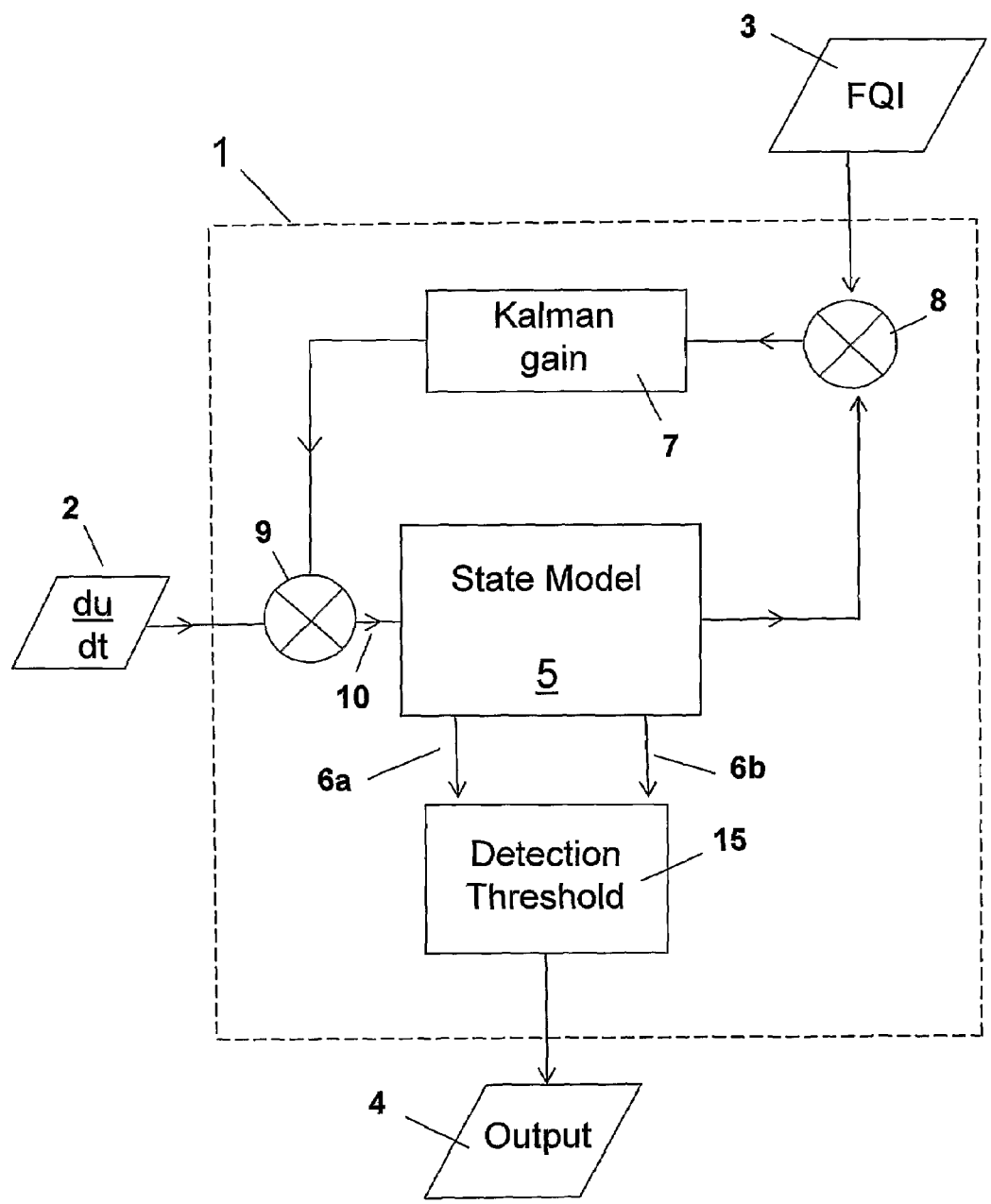
FIG. 1 is a schematic diagram illustrating the inputs and outputs of a fuel leak monitoring system on an aircraft.

FIG. 1 shows an embodiment of the fuel flow monitoring system. In this particular case, the fuel flow monitoring system is provided to monitor the fuel levels in a single fuel tank in an aircraft, the fuel tank supplying fuel to a single engine. The fuel flow monitoring system comprises a processor 1, which is formed as part of the fuel system monitoring and management system of the aircraft. The processor is arranged to receive electronic input signals including a measured fuel flow input 2 and a measured fuel quantity indication (FQI) input 3. A fuel flow sensor is located in the fuel feed line from the aircraft fuel tank to the aircraft engine and measures the rate of fuel $du/dt$ flowing along the feed line. The fuel flow sensor thus provides the fuel flow input 2. The fuel quantity input 3 is derived by a fuel quantity processor (not shown) from several different inputs from fuel level probes located at various locations in the aircraft fuel tank in consideration of the particular geometry of the fuel tank. Each probe is in the form of a shielded capacitance probe comprising two concentric conductive tubes. During use, an AC signal excites the respective capacitance probe 3 and, as aircraft fuel is a dielectric, when the level of fuel in the concentric tubes of the probe changes, the capacitance of the probe changes. These changes in capacitance are converted into electrical signals which are received by a signal processor (not separately shown), which calculates, with the use of the signals and in view of the known geometry of the tank and the probes, the amount of fuel in the tank.

The direct measurements made by the various sensors provide an indication of the state of the fuel flow system at the time at which they are taken. As with all measurements of physical systems there may be errors associated with the measurements made. The measurement (FQI) of the quantity of fuel in the fuel tank is particular prone to noise, most of which results from the errors introduced by movement of fuel as it sloshes around in the tank. In use, the processor 1 processes the inputs 2, 3 over time and calculates whether there might be a fuel leak. In the event that the processor 1 deems there to be a fuel leak, a signal is sent to a warning device 4 to warn the pilot of the aircraft that there may be a fuel leak. The warning device in this embodiment is in the form of a combination of an audible warning tone and a flashing light.

The method used by the processor 1 to determine whether or not there might be a fuel leak effectively includes assessing whether the values of (i) the measured amount of fuel in the tank and (ii) the rate of change of the amount of fuel in the tank are consistent with the values of (iii) the amount of fuel measured by the flow meter as having flowed from the fuel tank and (iv) the measured fuel flow rate. Values (i) and (iv) are ascertained from the direct measurements that yield the inputs 2, 3 sent to the processor 1. Values (ii) and (iii) are calculated by the processor from previously ascertained data. If the measurements made were free of errors and there are no leaks, then value (ii) would simply be the time differential of value (i) and value (iii) would simply be the time integral of value (iv).

The method of the embodiment of the present invention also takes account of measurement errors and effectively filters the measurements made to reduce the "noise" from such errors. More specifically, the method of the embodiment of the present invention utilises a Kalman filter which compares a measured value of FQI with a predicted value of FQI, derived from a model incorporating fuel flows and fuel leaks. As the name implies the Kalman filter embodies a filtering mechanism, which reduces the effects of both process errors and measurement errors.

FIG. 1 shows schematically the process performed by the processor 1. The process may be considered as effectively comprising a recursive loop. The loop will now be described taking the start (somewhat arbitrarily) of the loop as being a step (represented by box 5) of predicting the state of the system, at an instant T in time in the future in view of data (represented by arrow 10) concerning the state of the system, and the estimated fuel flow rate, at a time $T-\Delta T$ before that instant in time, the state being defined by the estimated FQI, the estimated fuel leak amount and the estimated fuel leak rate. Later, this prediction of the state of the system at time T is corrected, by means of a calculation using a Kalman gain matrix, in view of a measurement of the FQI (represented by box 3) at that time T. This correction procedure (represented by box 7) effectively uses a combination (represented by symbol 8) of the up-to-date measure at time T of the FQI (represented by box 3) and the predicted state of the system calculated in the previous step 5. The rate of flow of fuel from the fuel tank at that same given time is measured (input 2) and combined (symbol 9) with the corrected state of the system to provide the data (represented by arrow 10) concerning the state of the system at time T so that the step 5 of predicting the state of the system at a time T+ΔT in the future may be performed, thus repeating the loop. Thus the data (arrow 10) provided, concerning the corrected state of the system at a given time, includes data (represented by arrows 6a and 6b, respectively) of an estimated fuel leak amount and an estimated fuel leak rate. The estimated fuel leak data 6a, 6b are fed to a comparator 15 which ascertains whether the estimated fuel leak amount and/or rate are high enough to warrant the deemed detection of a fuel leak. If a leak is deemed detected a suitable output 4 is made.

The Kalman filter method will now be explained in further detail.

Firstly, let:

z=FQI, measured fuel quantity indication (equivalent to input 3) in Kg, y=modelled FQI (predicted output of Kalman filter) in Kg (i.e. without noise), u=fuel flow rate (equivalent to input 2) in Kg·s$^{-1}$, v=fuel leak rate, which, once a leak has started is, for the purpose of the model, assumed to be a constant (it is assumed for the method that the leak does not become progressively worse) in Kg·s$^{-1}$, w=fuel leak amount in Kg, and q=y−w, such that q effectively represents a modelled FQI in Kg without accounting for leaks.

Then, mathematically, the fuel depletion process can be modelled as follows (the dot above represents differentiation in time):

$$y(T) = \int_0^T u\,dt + w(T) \text{ and therefore} \tag{3}$$

$$\dot{y} = u + \dot{w}$$

$$\dot{q} = u$$

$$\dot{w} = v$$

$$\dot{v} = 0$$

$$y = q + w$$

Thus, in equation (3), the fuel leak amount is added to the integrated fuel flow rate to give the modelled output (FQI). No noise is added to the measured input fuel flow rate, u, as this noise process will behave like a leak rate and therefore appear within the leak rate signal, v.

If equation (3) is discretized using zero-order hold equivalence (i.e. backward difference) with a sample period of ΔT, and defining k as the sample time number, this yields:

$$q(k+1)=q(k)+\Delta T u(k)$$

$$w(k+1)=w(k)+\Delta T v(k)$$

$$v(k+1)=v(k)$$

$$y(k)=q(k)+w(k) \tag{4}$$

Writing equation (4) in matrix state-space form yields:

$$x(k+1) = Ax(k) + Bu(k) \tag{5}$$

$$y(k) = Cx(k)$$

where:

$$x(k) = \begin{pmatrix} q(k) \\ w(k) \\ v(k) \end{pmatrix} \text{ and}$$

$$A = \begin{bmatrix} 1 & 0 & 0 \\ 0 & 1 & \Delta T \\ 0 & 0 & 1 \end{bmatrix}, \quad B = \begin{bmatrix} \Delta T \\ 0 \\ 0 \end{bmatrix}, \text{ and } C = [1\ 1\ 0]$$

This state-space system is used to form a state observer (or estimator) that provides estimates of the required leak information. A Kalman filter is used to provide an improved estimate of the state. In the standard steady-state form, the Kalman filter provides an improved estimate $\hat{x}$ (k/k) of the state, x(k), given the output measurement, z(k) (i.e. the FQI input 3), and input measurement u(k) (i.e. the fuel flow rate input 2). The nomenclature k/k refers to the estimate at sample time k, given information up to sample time k. In the present embodiment, the sample period ΔT is chosen to be 15 seconds. The Kalman filter is effected by means of the following equations:

predictor equation: $\hat{x}(k/k-1) = A\hat{x}(k-1/k31\ 1) + Bu(k-1)$ corrector equation: $\hat{x}(k/k) = \hat{x}(k/k-1) + M[z(k) - C\hat{x}(k/k-1)]$ (6)

where M is a steady-state Kalman gain (or blending factor) matrix that has been calculated in advance by means of a discrete linear quadratic estimator algorithm. The Kalman gain is thus constant during the monitoring for fuel leaks, rendering the Kalman gain matrix non-adaptive, but stable. In this embodiment the dlqe (discrete linear quadratic estimator) command in the programming language "Matlab" (a Registered Trademark of The MathWorks Inc, U.S.A.) is used to obtain the results [M, P, Z, E] from the function dlqe (A, G, C, Q, R), where M is (as mentioned above) the Kalman gain matrix P is an output not used in the present embodiment Z is the estimate error covariance after the measurement update (not used in the present embodiment)

E is an output not used in the present embodiment $$G = \begin{bmatrix} 1 & 0 & 0 \\ 0 & 1 & 0 \\ 0 & 0 & 1 \end{bmatrix}, \quad G \text{ being identity in this case,} \tag{7}$$

but having a neutral effect on the calculation

Q is the weighting given to the process noise covariance and is preselected by prior tuning (from modelling or experimentation), such that $$Q = \begin{bmatrix} 10^{-3} & 0 & 0 \\ 0 & 9{,}000 & 0 \\ 0 & 0 & 0.1 \end{bmatrix} \begin{matrix} \text{–this value weights the process noise} \\ \text{associated with the } FQI \text{ prediction} \\ \text{–this value weights the process noise} \\ \text{associated with the fuel leak amount} \\ \text{–this value weights the process noise} \\ \text{associated with the fuel leak rate} \end{matrix}$$

R is the weighting given to the measurement noise covariance and is preselected by prior tuning (from modelling or experimentation), such that $R=6\times 10^7$, the higher this number is, the greater the filtering effect.

Equation (6) can be rearranged to give the following simple estimator equation:

$$\hat{x}(k/k) = A'\hat{x}(k-1/k-1) + B'u(k-1) + Mz(k) \quad (8)$$

where $A' = A - MCA$ and $B' = B - MCB$

Figure 2:
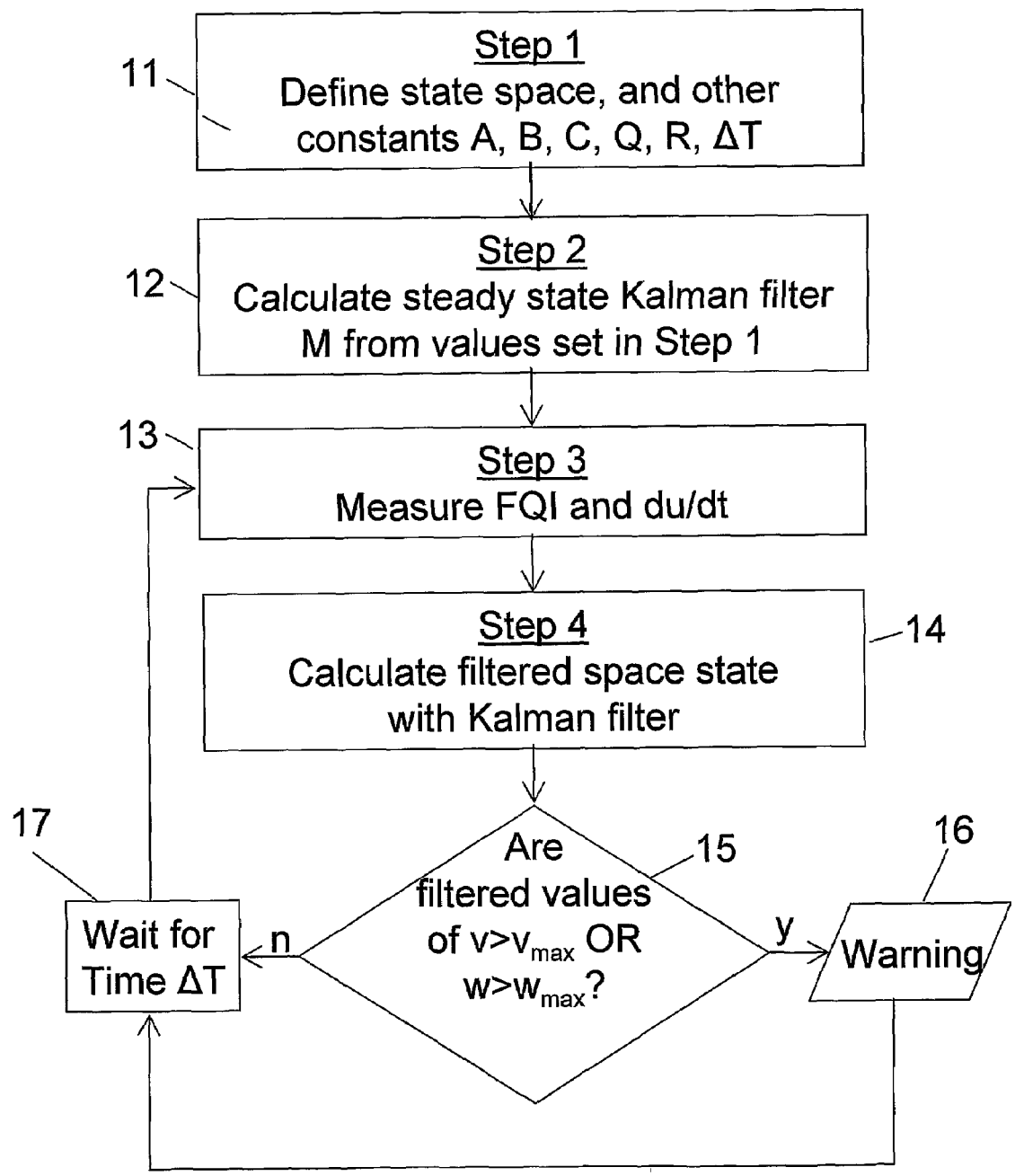
FIG. 2 shows a flow diagram illustrating schematically the steps taken by the fuel leak monitoring system to determine whether or not a fuel leak might exist.

The performance by the processor 1 of the fuel leak monitoring method using a Kalman filter will now be described with reference to FIG. 2. As a first step 11 the state space $\hat{x}_0$ at time $T_0$ is defined assuming a leak rate of zero (i.e. v=0) and complete accuracy of the measurements of the fuel flow input 2 (parameter u) and the FQI input 3 (parameter z). Also, values are assigned to parameters A, B, C, Q, R, and the sample period of $\Delta T$ in accordance with the values defined above in equations (5) and (7). Then in a second step 12, the steady-state Kalman gain matrix M is calculated by using the Matlab function dlqe (A, G, C, Q, R). (It will be appreciated that the first and second steps 11, 12 could actually be performed in advance and in isolation from the aircraft by using an appropriate mathematical model of the fuel system of the aircraft. The values of the constants and a nominal initial estimate of the system state could for example be pre-programmed as pre-set constants in the processor 1 during installation or programming of the processor 1 in the aircraft.) Then as a third step the inputs 2, 3 representative of the measurements of the flow rate du/dt and the FQI measurement are sampled by the processor at a time T. The filtered estimated state quantity $\hat{x}$ at time T is then calculated in a fourth step 14 by means of equation (8) from the estimated state quantity $\hat{x}$ at time $T-\Delta T$ (in this initial calculation by using $\hat{x}_0$) and the measured flow rate ($u_0$) at time $T-\Delta T$ and the measured FQI at time T. The state quantity $\hat{x}(k/k)$ (at sample time k, where $k=T/\Delta T$), thus calculated, contains a Kalman-filtered leak rate estimate, $\hat{v}(k/k)$, and leak amount $\hat{w}(k/k)$. These quantities are equivalent to values obtained by the integral fuel flow method currently used in the prior art, but with improved filtering of noise, and an optimally filtered value of a fuel leak rate calculated from the rate of change of the FQI (calculated from input 3) and the measured fuel flow rate (input 2). Both of the values of the leak rate estimate, $\hat{v}(k/k)$, and leak amount $\hat{w}(k/k)$ are monitored to assess (comparator 15) whether there is a fuel leak. If the leak rate estimate v OR the leak amount w exceeds certain preset thresholds $v_{max}$ and $w_{max}$, respectively, (in this case, $v_{max}=1.3$ tonnes/hour and $w_{max}=3.6$ tonnes) the processor 1 causes the warning device 4 to be activated (box 16). The system then repeats the steps from the third step 13 onwards in respect of a new sample time equal to $T+\Delta T$, thus effectively waiting (box 17) for a time $\Delta T$ before taking further measurements. The method is repeated until the monitoring system is deactivated.

The Kalman filter thus realizes a much more compact implementation of two leak detection methods (the integral method and a differential method), thereby reducing past measurement and state storage and furthermore achieving improved noise rejection properties.

Whilst the present invention has been described and illustrated with reference to a particular embodiment, it will be appreciated by those of ordinary skill in the art that the invention lends itself to many different variations not specifically illustrated herein. By way of example, it will be appreciated that in certain embodiments of the invention, a single fuel flow rate sensor will not be sufficient to account for all means in which fuel may be used or depleted. In addition to a fuel leak and fuel being used by the engines of an aircraft, fuel may be depleted by means of usage of fuel by auxiliary power units, fuel flow to surge tanks (but not including flow of fuel from the surge tanks overboard, because such loss of fuel is in the present context classified as a leak), fuel being dispensed during air-to-air refuelling, intentional jettison of fuel (for example in an emergency), defuelling (for example, when the aircraft is grounded), fuel lost (as being unusable) within the fuel flow system as a result of a fuel transfer problem. Sensors are provided in order to account for all of the above means of fuel depletion when present. Additionally, account must be taken of input of fuel into the tanks, for example, by means of refuelling, either on the ground or during air-to-air refuelling, or by means of a surge tank scavenge. The method may be improved by providing extra means for facilitating detection of leaks downstream of a flow rate sensor.

The Kalman filtering method could be modified to be adaptive.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of detecting a fuel leak from a fuel store, the method comprising the steps of:
   (i) receiving at a circuit signals representative of physical measurements made at a plurality of successive times of the amount of fuel in the fuel store of an aircraft and of the rate of fuel flowing from the fuel store, the measurements each being subject to noise,
   (ii) the circuit defining, in state-space, a fuel flow system state, the fuel flow state of the system being defined by a set of variables including at least one variable relating to a quantity represented by the signals received in step (i) and a variable relating to fuel leakage from the fuel source,
   (iii) the circuit ascertaining a new fuel flow state of the system in view of a previously ascertained fuel flow state of the system and a plurality of the measurements represented by the signals received in step (i),
   (iv) the circuit identifying from the new fuel flow state of the system whether there might be a fuel leakage, and, when a fuel leakage is determined,
   (v) causing an indication that there is a suspected fuel leak to be made.

2. A method according to claim 1, wherein step (iv) comprises ascertaining a fuel leak amount from one or more values of the fuel flow state of the system.

3. A method according to claim 2, including a step of the circuit deeming a leak present in the event that the fuel leak amount is greater than a preset threshold.

4. A method according to claim 1, wherein step (iv) comprises ascertaining a fuel leak rate from one or more values of the fuel flow state of the system.

5. A method according to claim 4, including a step of the circuit deeming a leak present in the event that the fuel leak rate is greater than a preset threshold.

6. A method according to claim 1, wherein step (iv) comprises ascertaining a fuel leak amount from one or more values of the fuel flow state of the system and ascertaining a fuel leak rate from one or more values of the fuel flow state of the system and the method includes a step of the circuit deeming a leak present in the event that the fuel leak amount is greater than a preset threshold or in the event that the fuel leak rate is greater than a preset threshold.

7. A method according to claim 1, wherein the ascertaining of the new fuel flow state of the system takes into account only one previous ascertained fuel flow state of the system.

8. A method according to claim 1, wherein during step (iii) the plurality of the measurements taken into account by the circuit when ascertaining the new fuel flow state of the system are representative of a plurality of different quantities, and wherein in respect of all of the respective different quantities taken into account when ascertaining the new fuel flow state of the system, the time of each physical measurement is identical in respect of a single quantity being measured.

9. A method according to claim 8, wherein at least two of the measurements taken into account when ascertaining the new fuel flow state of the system are derived from physical measurements of different quantities taken at different times.

10. A method according to claim 1, wherein the step of ascertaining the new fuel flow state of the system includes taking into account a single previous ascertained fuel flow state of the system, a single previous physical measurement of the rate of fuel used by the aircraft and a single current physical measurement of the amount of fuel in the fuel store.

11. A method according to claim 1, wherein the variables defining the fuel flow state of the system include a measure of a quantity or fuel, a fuel leak rate and a fuel leak amount.

12. A method according to claim 1, wherein the step of ascertaining the new fuel flow state of the system is in the form of a recursive state estimation method.

13. A method according to claim 1, wherein the step of ascertaining the new fuel flow state of the system is achieved by means of a Kalman filter algorithm.

14. A method according to claim 1, including a step of ascertaining the probable flow-rate of the leak and the probable amount of fuel that has leaked.

15. A software product comprising a computer usable medium carrying a software code embodied therein enabling a processor to perform the method of claim 1.

16. A circuit arranged to perform the method of claim 1.

17. A circuit according to claim 16 arranged to receive inputs representative of the amount of fuel in the fuel store of an aircraft, and of the rate of fuel used by the aircraft and also arranged to provide an output indicative of whether there might be a fuel leak.

18. A circuit according to claim 17, wherein the circuit comprises a suitably programmed processor.

19. A circuit for detecting a fuel leak from a fuel store, the circuit comprising:
(i) an input device connected to receive signals representative of physical measurements of the amount of fuel in the fuel store of an aircraft and of the rate of fuel flowing from the fuel store,
(ii) a memory adapted to store data representative of a fuel flow system state, in state-space, the fuel flow state of the system being defined by a set of variables including at least one variable relating to a quantity represented by the signals received at the input device, and a variable relating to fuel leakage from the fuel source,
(iii) a processor adapted to calculate a new fuel flow state of the system in view of a previously calculated fuel flow state of the system and a plurality of the measurements represented by the signals received at the input device and adapted to identify from the new fuel flow state of the system calculated by the processor whether there might be a fuel leak and
(iv) an output device connected to the processor adapted to output a signal to indicate that there is a suspected fuel leak in dependence on the calculations performed by the processor.

20. A software product comprising a computer usable medium carrying a software code embodied therein enabling a processor to be programmed to function as the processor of the circuit of claim 19, wherein the software product includes a Kalman filter module for calculating the state of the system.

* * * * *